(12) United States Patent
Temizel

(10) Patent No.: US 9,460,403 B2
(45) Date of Patent: Oct. 4, 2016

(54) METHODS AND SYSTEMS RELATED TO HYDROCARBON RECOVERY STRATEGY DEVELOPMENT

(75) Inventor: Cenk Temizel, Houston, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 748 days.

(21) Appl. No.: 13/562,440

(22) Filed: Jul. 31, 2012

(65) Prior Publication Data

US 2014/0039795 A1 Feb. 6, 2014

(51) Int. Cl.
| | |
|---|---|
| G01V 1/40 | (2006.01) |
| G06Q 10/06 | (2012.01) |
| E21B 47/00 | (2012.01) |
| E21B 49/00 | (2006.01) |
| G01V 1/50 | (2006.01) |
| G01V 1/30 | (2006.01) |

(52) U.S. Cl.
CPC ............... *G06Q 10/06* (2013.01); *E21B 47/00* (2013.01); *E21B 49/00* (2013.01); *G01V 1/30* (2013.01); *G01V 1/50* (2013.01); *G06Q 10/063* (2013.01)

(58) Field of Classification Search
USPC .......................................................... 702/11
See application file for complete search history.

(56) References Cited

U.S. PATENT DOCUMENTS

| | | | |
|---|---|---|---|
| 5,586,082 A * | 12/1996 | Anderson et al. ............. 367/73 |
| 7,627,461 B2 | 12/2009 | Guyaguler et al. | |
| 7,657,494 B2 | 2/2010 | Wilkinson et al. | |
| 7,963,327 B1 | 6/2011 | Saleri et al. | |
| 2007/0192072 A1 | 8/2007 | Cullick et al. | |
| 2008/0065362 A1 | 3/2008 | Lee et al. | |
| 2008/0249906 A1* | 10/2008 | Landis, Jr. et al. ............. 705/35 |
| 2010/0005111 A1 | 1/2010 | Bal et al. | |
| 2011/0118983 A1 | 5/2011 | Rowan | |
| 2011/0168391 A1 | 7/2011 | Saleri et al. | |

FOREIGN PATENT DOCUMENTS

| | | |
|---|---|---|
| WO | WO-2005001661 A2 | 1/2005 |
| WO | WO-2005-076124 A1 | 8/2005 |
| WO | WO-2007084741 A3 | 7/2007 |
| WO | WO-2009048776 A3 | 4/2009 |

OTHER PUBLICATIONS

PCT Search Report and Written Opinion, International application No. PCT/US2013/043872, mailed Aug. 27, 2013.
Written Opinion, Application No. 11201500301W, Dec. 11, 2015, 5 pages, Intellectual Property Office of Singapore.

(Continued)

*Primary Examiner* — Paul D Lee

(57) ABSTRACT

Hydrocarbon recovery strategy development. At least some of the illustrative embodiments are methods including: selecting a set of attributes regarding a first undeveloped hydrocarbon reservoir; identifying a first group of developed hydrocarbon reservoirs, the identifying based on the set of attributes of the first undeveloped hydrocarbon reservoir, and the identifying by a computer system; calculating a first set of statistical data based on the first group of developed hydrocarbon reservoirs, the calculating by the computer system; scaling the first set of statistical data in reference to the set of attributes of the first undeveloped hydrocarbon reservoir to create a second set of statistical data, the scaling by the computer system; and implementing at least one hydrocarbon recovery strategy for the first undeveloped hydrocarbon.

20 Claims, 5 Drawing Sheets

(56) References Cited

OTHER PUBLICATIONS

Supplementary European Search Report, European Patent Office, EP Application No. 13825063, Jan. 5, 2016, 6 Pages.

The Federal Institute of Industrial Property, Office Action, Jul. 5, 2016, 7 pages, Russian Application No. 2015106854, Russia.

The Federal Institute of Industrial Property, Office Action Translation, Jul. 5, 2016, 5 pages, Russian Application No. 2015106854, Russia.

* cited by examiner

METHODS AND SYSTEMS RELATED TO HYDROCARBON RECOVERY STRATEGY DEVELOPMENT

CROSS-REFERENCE TO RELATED APPLICATIONS

None.

BACKGROUND

Strategic decision-making with regard to petroleum exploration and production activities is used to increase hydrocarbon recovery. However, decision-making with regard to developing new fields can be complicated by a lack of known and sufficiently documented data. Thus, any technology which makes decision-making with regard to developing new fields more efficient and more effective would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Figure 1:
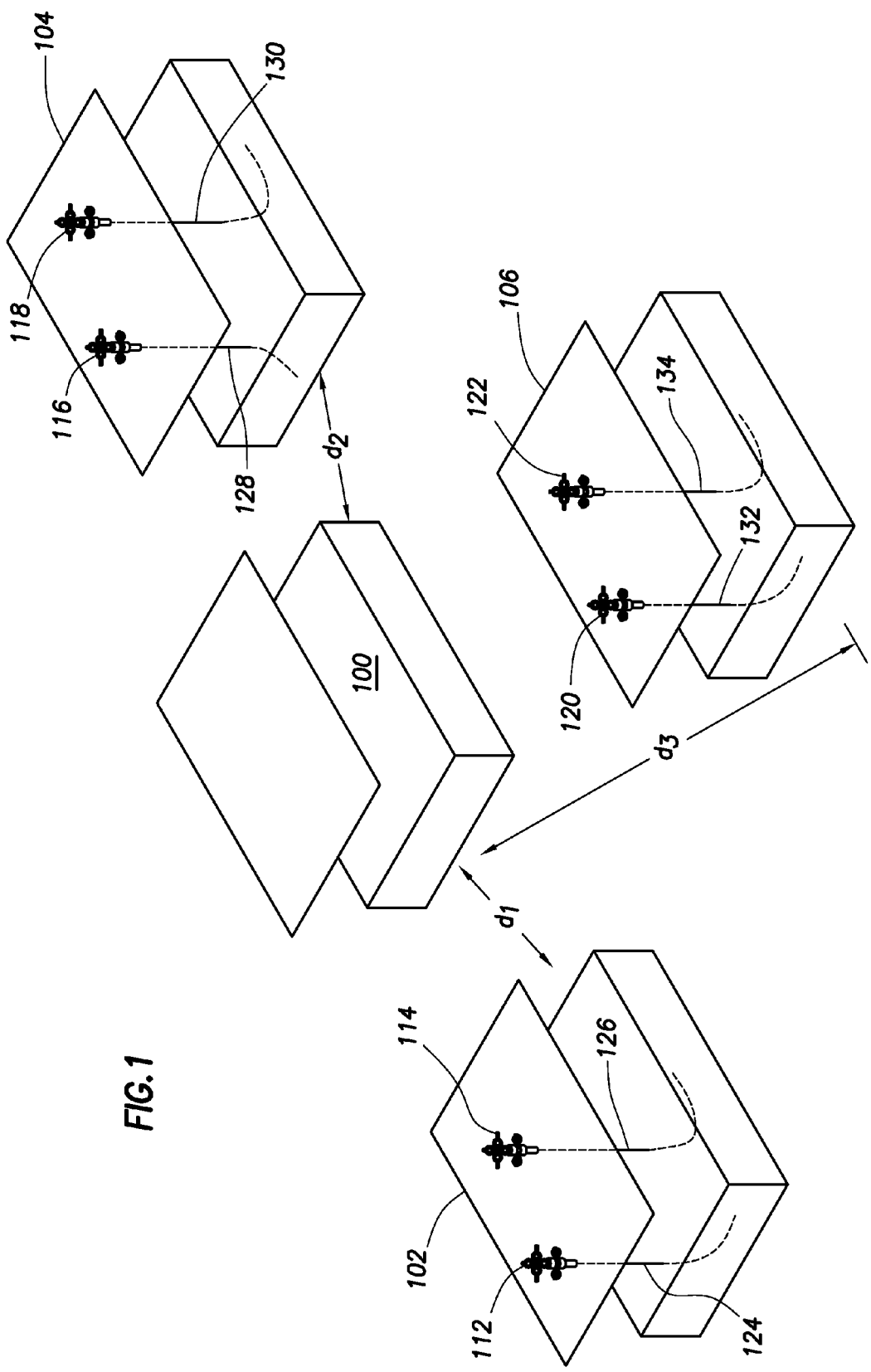
FIG. 1 shows a perspective cut-away view of an example embodiment of undeveloped and developed fields in their relationship with each other.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Undeveloped hydrocarbon reservoir" shall mean that a hydrocarbon reservoir that has had less than five percent (5%) of the hydrocarbons extracted.

"Developed hydrocarbon reservoir" shall mean a hydrocarbon reservoir that has had more than twenty percent (20%) of the hydrocarbons extracted.

"Nearest-neighbor mathematical analysis" shall mean a mathematical analysis that identifies how well selected attributes of a first reservoir match attributes of a second reservoir. Nearest-neighbor analysis shall not be limited to an analysis of physical proximity alone.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to hydrocarbon recovery strategy development. More particularly, at least one embodiment involves selecting a set of attributes related to an undeveloped hydrocarbon reservoir to be developed. After selecting a set of known attributes from which a development strategy will be created, a subset of developed hydrocarbon reservoirs having attributes analogous to the undeveloped hydrocarbon reservoir is amassed from a variety of available databases and agencies. Statistical data based on the analogous subset of developed hydrocarbon reservoirs is calculated, and the data is scaled based on attributes of the undeveloped hydrocarbon reservoir. Using the scaled data, a reservoir simulation model may be created, run, and analyzed in order to select and implement at least one hydrocarbon recovery strategy for the undeveloped hydrocarbon reservoir. In order to more fully describe the methods and systems, the specification first turns to a high level description to orient the reader.

FIG. 1 shows a perspective partial cut-away view of an example relationship between reservoirs in accordance with at least some embodiments. In particular, reservoir 100 is an undeveloped hydrocarbon reservoir. Reservoirs 102, 104, and 106 are previously or currently developed hydrocarbon reservoirs, as illustrated by wellheads 112-122 and boreholes 124-134. In order to not unduly complicate the discussion, only three developed hydrocarbon reservoirs shown in this example, and the developed hydrocarbon reservoirs are shown only to have producing wells. However, any number of developed hydrocarbon reservoirs may be considered, and the developed hydrocarbon reservoirs may themselves still be under development (e.g., additional boreholes being drilled, fracturing additional zones in previously drilled wells). Undeveloped hydrocarbon reservoir 100 is located distance d1 from reservoir 102, distance d2 from reservoir 104, and distance d3 from reservoir 106. The distance between reservoirs may be on the order of thousands of feet, miles, hundreds of miles, or thousands of miles. For example, undeveloped hydrocarbon reservoir 100 may be located in Texas, along with developed hydrocarbon reservoir 102, whereas developed hydrocarbon reservoir 104 may be located in Venezuela, and developed hydrocarbon reservoir 106 may be located in Saudi Arabia. In another embodiment, all four example reservoirs may be located within a specific geographic area.

Developed hydrocarbon reservoirs 102, 104, and 106 are associated with attributes specific to each reservoir respectively. For example, each developed hydrocarbon reservoir may be associated with such attributes as, but not limited to: geographic location; physical area; production quantity; formation rock type; recovery factor; number of wells drilled; reservoir properties (e.g., permeability, porosity, wettability); recovery method; secondary and tertiary recovery techniques (e.g., water flooding, steam assisted gravity drainage, steam injection); burial depth; burial temperature; cumulative oil recovery; initial hydrocarbon volume; oil/water/gas production rates; and surface accessibility. Each of these attributes may be maintained in a database, or in multiple databases, such as databases maintained by agencies IHS, Inc. of Houston, Tex., and Peloton Computer Enterprises Ltd, of Katy, Tex. The scope of data within the database may range from data for all developed hydrocarbon reservoirs across the globe, the database specific to one company's developed hydrocarbon reservoirs, or to a database regarding reservoirs only located within a specific geographic area (e.g., reservoirs within 1000 mile radius of the undeveloped hydrocarbon reservoir). In yet another embodiment, a database may be comprised of reservoirs matching a specific selection of criteria. In considering the attributes of previously or currently developed hydrocarbon reservoirs, a decision-maker may be able to consider and analyze such data in order to implement a development strategy with regard to undeveloped hydrocarbon reservoir 100. The specification now turns to how a decision-maker uses the database or databases regarding developed hydrocarbon reservoirs in developing such a strategy.

Figure 2:
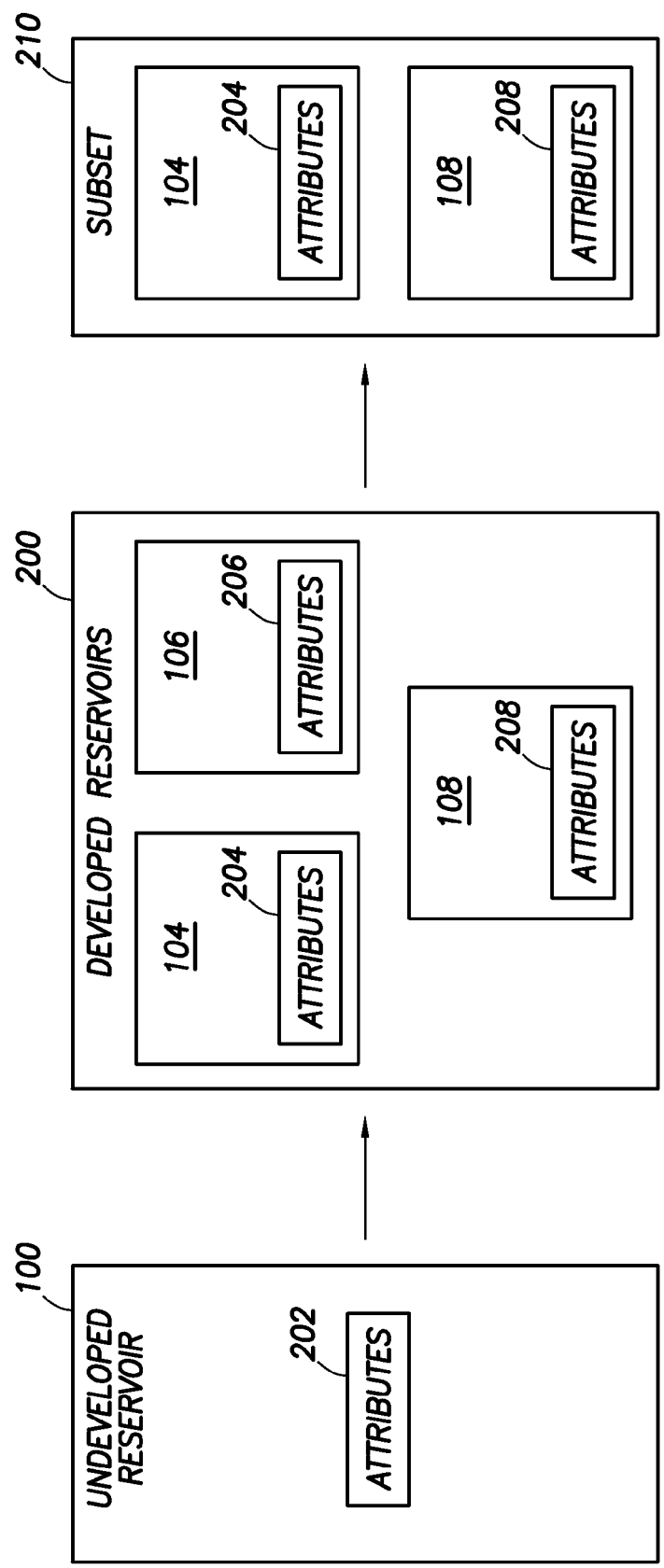
FIG. 2 shows, in block diagram form, a flow diagram in accordance with at least some embodiments.

FIG. 2 shows, in block diagram form, a visual depiction of an example relationship between reservoirs, both developed and undeveloped. In particular, undeveloped hydrocarbon reservoir 100 has a set of attributes 202. It can be assumed that because reservoir 100 is not yet developed, the attributes related to reservoir 100 are not fully known. However, many attributes may be known, such as the rock type, hydrocarbon type, and/or surface accessibility. Although in this example three attributes have been used, any number of attributes may be known and/or used at this point.

A database, or a group of databases, may contain attribute data related to any number of previously or currently developed hydrocarbon reservoirs. For example, database 200 may contain attribute data related to a group of developed hydrocarbon reservoirs. In the example of FIG. 2, the group of developed hydrocarbon reservoirs 200 contains reservoirs 104, 106, and 108, each with a set of attributes 204, 206, and 208, respectively. Reservoirs 104, 106, and 108 may be located any distance from undeveloped hydrocarbon reservoir 100.

In order to create a development strategy, the attributes 202 for the undeveloped hydrocarbon reservoir, or a select subset of the attributes 202, may be selected. From this selection of known attributes 202, a subset of developed hydrocarbon reservoirs having analogous attributes to undeveloped hydrocarbon reservoir 100 may be identified. For example, from the database of developed hydrocarbon reservoirs 200, a subset developed hydrocarbon reservoirs with a similar rock type, hydrocarbon type, and surface accessibility as undeveloped hydrocarbon reservoir 100 may be selected. In FIG. 2, two developed hydrocarbon reservoirs with analogous attributes to those of undeveloped hydrocarbon reservoir 100 have been identified and selected—developed hydrocarbon reservoirs 104 and 108 having respective attributes 204 and 208. In this example, the two identified developed hydrocarbon reservoirs 104 and 108 make up a subset of developed hydrocarbon reservoirs 210.

Identifying the analogous reservoirs (i.e., the group of developed hydrocarbon reservoirs) may take many forms. In some cases, the identification and selection of the group of developed hydrocarbon reservoirs may be by a human operator; however, in many cases amount varied types of data to be considered in selecting one or more developed hydrocarbon reservoirs may be too voluminous to be efficiently analyzed by a human operation. Thus, in other cases, identifying the group of developed hydrocarbon reservoirs is performed by a computer system. For example, in some cases identifying the group of developed hydrocarbon reservoirs is based on calculating and applying a nearest-neighbor mathematical analysis, where the analysis mathematically identifies how well selected attributes of a first reservoir match attributes of a second reservoir.

The nearest-neighbor analysis shall not be limited to an analysis of physical proximity, but may also be based on any number of criteria (e.g., physical proximity, formation type, and/or recovery technique). Although physical proximity, formation type, and recovery technique are three possible examples of nearest-neighbor analysis criteria, the analysis is not limited to these three examples. Moreover, the nearest-neighbor analysis need not be limited to a single dimension; that is, while in some cases the nearest-neighbor analysis is applied for a single attribute; in other cases, the nearest-neighbor analysis may be multi-dimensional. For example, a developed hydrocarbon reservoir may not be selected on a single criteria (e.g., physical proximity), but may still be indicated as a potentially analogous developed hydrocarbon reservoir based on a plurality of other attributes matching the set of attributes related to the undeveloped hydrocarbon reservoir. An example nearest-neighbor equation is shown below:

$$\text{Similarity}(A, B) \equiv \frac{\sum_{i=1}^{n} fi(Ai, Bi) * wi}{\sum_{i=1}^{n} wi} \quad (1)$$

where A represents the undeveloped hydrocarbon reservoir to be developed; B represents a developed hydrocarbon reservoir, the data related to that which is maintained in a database; n represents the number of attributes used to describe a reservoir; $(A_i, B_i)$ represents the attributes which describe reservoirs A and B; $f_i$ is the distance function for the $i^{th}$ attribute, the distance function appropriately chosen for each individual reservoir attribute (not limited to physical distance); and $w_i$ defines the weight of each reservoir attribute relative to the other attributes (e.g., which of the attributes should be given a higher importance based on the desired outcome). In another embodiment, other comparison algorithms may be used.

Referring again to FIG. 2, regardless of which technique is utilized to identify the group of developed hydrocarbon reservoirs, the two developed hydrocarbon reservoirs 104 and 108 have been identified as having attributes analogous to the desired attributes of the undeveloped hydrocarbon reservoir 100. While only two reservoirs are identified in the example subset of reservoirs 210, any number of reservoirs may be identified and selected as subset of developed hydrocarbon reservoirs 210. The number of reservoirs that comprises the subset of developed hydrocarbon reservoirs may be on the order of tens, hundreds, or even thousands. Once the subset of reservoirs 210 comprising a group of developed hydrocarbon reservoirs with analogous attributes is determined, data related to the subset of developed hydrocarbon reservoirs 210 is organized and categorized based on a plurality of criteria, including: reservoir rock type (e.g., carbonate, sandstone, shale, limestone); type of reserves (e.g., gas, oil, heavy oil, tight-gas, shale gas); reservoir drive mechanism (e.g., solution-gas drive, gas cap drive, water drive); reservoir properties (e.g., porosity, permeability); secondary and tertiary recovery methods applied (e.g., waterflooding, steam assisted gravity drainage, polymer flooding, steam injection, cyclic steam stimulation, in-situ combustion, microbial enhanced oil recovery, chemical flooding); oil density; and reservoir fluid behavior (e.g., dry gas, wet gas, gas condensate). The criteria upon which the data is organized and categorized is not limited to the criteria described above, nor must all the criteria described above be used in organizing and categorizing the data.

Figure 3:
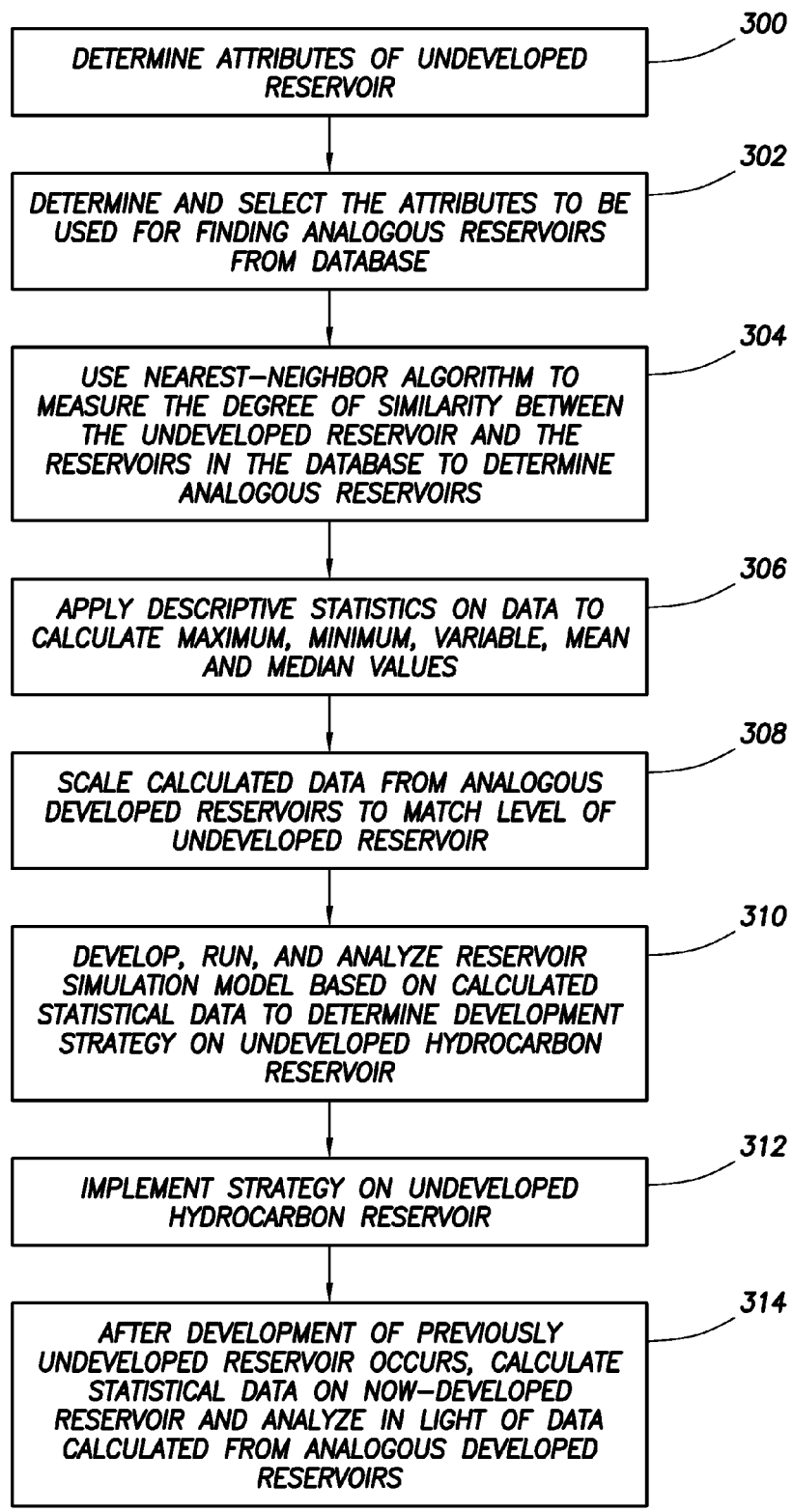
FIG. 3 shows, in block diagram form, a flow diagram in accordance with at least some embodiments.

Now that a subset of developed hydrocarbon reservoirs 210 has been identified, the computer system calculates a set of statistical data related to the subset 210. Turning now to FIG. 3, FIG. 3 shows a flow diagram describing the development of a hydrocarbon recovery strategy in accordance with example embodiments. As discussed previously, attributes related to the undeveloped hydrocarbon reservoir 100 are determined (block 300). From undeveloped hydrocarbon reservoir 100, a selection of desired attributes is chosen in order to compare and determine an analogous subset of developed hydrocarbon reservoirs (block 302). Using a nearest-neighbor algorithm, as described above in Equation 1, or another comparison algorithm, the degree of similarity between the selected attributes 202 of undeveloped hydrocarbon reservoir 100 and any number of developed hydrocarbon reservoirs 200 maintained in one or more databases is determined, returning a subset of developed hydrocarbon reservoirs 210 (block 304).

Still referring to FIG. 3, a set of statistical data related to the subset of developed hydrocarbon reservoirs 210 is calculated, in some cases by applying descriptive statistics for each type of reservoir in the database to determine various values. The calculated statistical data may comprise, but is not limited to: average hydrocarbon production; maximum hydrocarbon production; minimum hydrocarbon production; hydrocarbon production rate; secondary recovery fluid production rate; oil production rate; gas production rate; cumulative oil recovery; average hydrocarbon recovery cost; maximum hydrocarbon recovery cost; and minimum hydrocarbon recovery cost (block 306). Stated otherwise, the calculation of statistical data related to developed hydrocarbon reservoirs having similar attributes to the undeveloped hydrocarbon reservoir provides a statistically supported snapshot of what may be expected from the undeveloped hydrocarbon reservoir.

The calculated statistical data may be scaled based on characteristics of the undeveloped hydrocarbon reservoir, which aids in making a more well-informed decision. That is, the statistical data as calculated may be for reservoirs significantly larger or smaller than the size of the undeveloped hydrocarbon reservoir, making it difficult to analyze the data directly in light of the undeveloped hydrocarbon reservoir. Thus, after the set of statistical data is calculated for the subset of reservoirs 210, the computer system then mathematically scales the calculated statistical data based on the size of the respective reservoirs (block 308). In one embodiment, the statistical data may be scaled down if the undeveloped hydrocarbon reservoir 100 is of a smaller initial hydrocarbon volume and/or physical size than the average initial volume and/or physical size of the group of developed hydrocarbon reservoirs 210. In another embodiment, the statistical data may be scaled up if the undeveloped hydrocarbon reservoir 100 is of a larger initial hydrocarbon volume and/or physical size than the average initial volume and/or physical size of the group of developed hydrocarbon reservoirs 210.

Still referring to FIG. 3, with the data related to the subset of developed hydrocarbon reservoirs 210 scaled based on the undeveloped reservoir 100, a reservoir simulation model may be developed, run, and analyzed in order to determine a strategic plan related to the development of undeveloped hydrocarbon reservoir 100 (block 310). However, in another embodiment, the reservoir simulation model may be developed, run, and analyzed before the data has been scaled. Regardless of the timing of the scaling in relation to the model, the results of the reservoir simulation model may be used to understand the strengths and/or weaknesses of the reservoir to be developed (i.e., undeveloped hydrocarbon reservoir 100), and a hydrocarbon extraction implementation strategy may be selected based on any suitable criteria (e.g., the scenario having a high net present value) (block 312).

The statistical data calculated may be useful not only when selection and implemented strategies for hydrocarbon extraction, but also after development has begun. Thus, in some cases, after development of the undeveloped has begun, another set of statistical data may be calculated. The statistical data in this case is with respect to the undeveloped hydrocarbon reservoir (block 314). (The specification will continue to refer to the reservoir under development as the undeveloped hydrocarbon reservoir 100 to avoid confusion, in spite of the fact that, in this example, development has begun). The statistical calculations related to the newly developed reservoir 100 may comprise, but are not limited to: average hydrocarbon production; maximum hydrocarbon production; minimum hydrocarbon production; hydrocarbon production rate; secondary recovery fluid production rate; oil production rate; gas production rate; cumulative oil recovery; average hydrocarbon recovery cost; maximum hydrocarbon recovery cost; and minimum hydrocarbon recovery cost of the reservoir 100. Using these newly calculated statistics regarding the previously undeveloped hydrocarbon reservoir 100, an analysis may be performed which provides an indication of performance of the undeveloped reservoir in relation to the original set of statistical data. That is, the analysis may be used to determine how the implemented strategy or strategies are performing regarding the set of statistical data regarding the group of developed hydrocarbon reservoirs. The analysis of the relationship between the two set of calculated statistical data may be used to aid in future decision-making.

The initial set of statistical data and related methods, as well as the set of statistical data regarding the undeveloped hydrocarbon reservoir 100 after at least partial development, may find uses in several respects. For example the various sets of statistical data may be used for: benchmarking scope-for-recovery and reserves estimation; best practice sharing; decision-making under limited information/high uncertainty; applying lessons learned and best practices from previous successes and failures, capturing the success/failures for future benefit; preferred development options and recovery factors; understanding uncertainties for field and reservoir appraisal; and assisting in technical and economic scenario modeling.

Example Computing Environment

Figure 4:
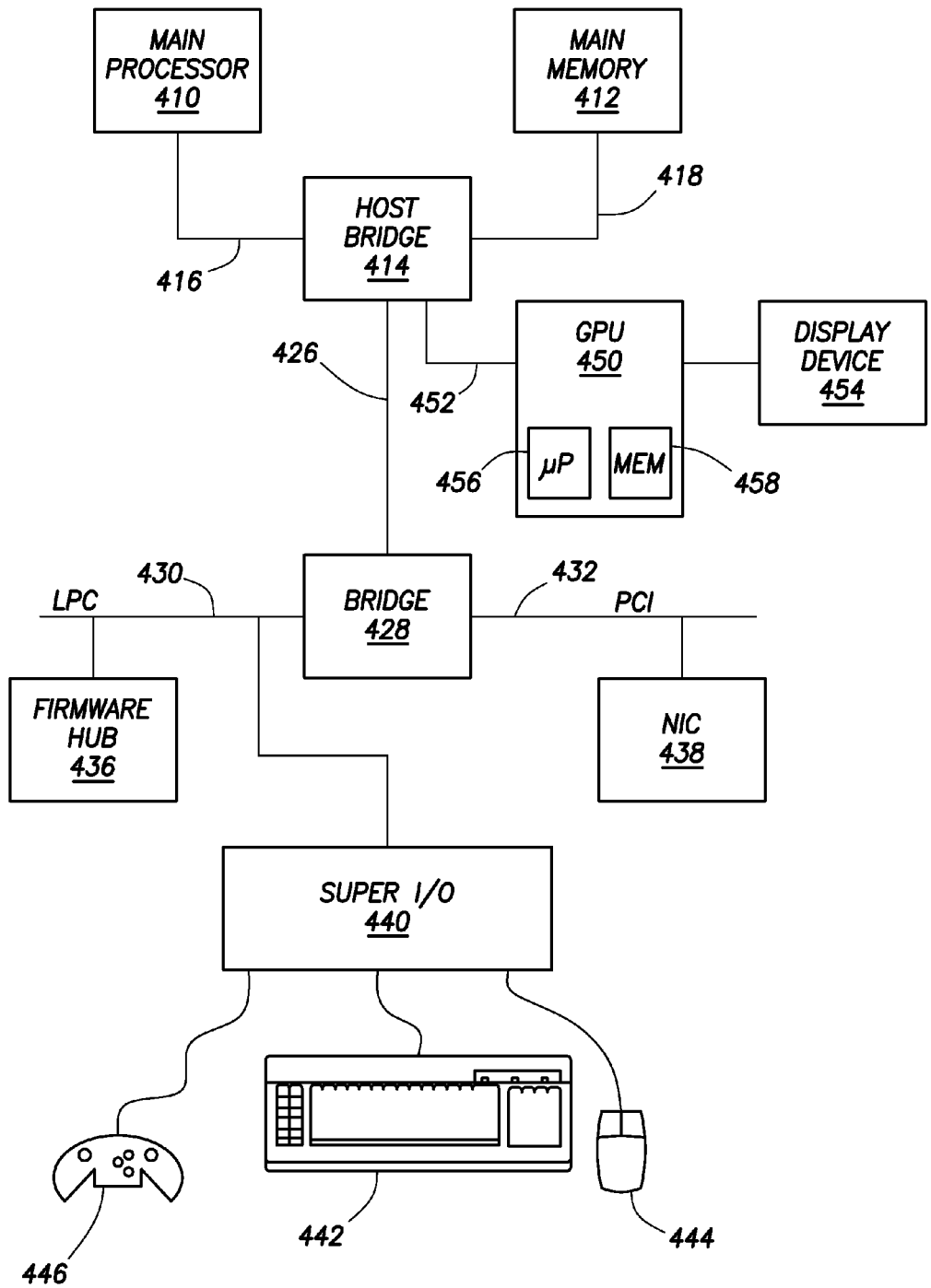
FIG. 4 shows a computer system in accordance with at least some embodiments.

The various embodiments discussed to this point operate in conjunction with a computer system. FIG. 4 illustrates a computer system in accordance with at least some embodiments. Any or all of the embodiments that involve selecting a set of attributes, identifying a group of developed hydrocarbon reservoirs, calculating a set of statistical data and scaling statistical data may be implemented, in whole or in part, on a computer system such as that shown in FIG. 4, or on after-developed computer systems. In particular, the computer system comprises a main processor 410 coupled to a main memory array 412, and various other peripheral computer system components, through integrated host bridge 414. The main processor 410 may be a single processor core device, or a processor implementing multiple processor cores. Furthermore, the computer system may implement multiple main processors 410. The main processor 410 couples to the host bridge 414 by way of a host bus 416, or the host bridge 414 may be integrated into the main processor 410. Thus, the computer system may implement other bus configurations or bus-bridges in addition to, or in place of, those shown in FIG. 4.

The main memory 412 couples to the host bridge 414 through a memory bus 418. Thus, the host bridge 414 comprises a memory control unit that controls transactions to the main memory 412 by asserting control signals for memory accesses. In other embodiments, the main processor 410 directly implements a memory control unit, and the main memory 412 may couple directly to the main processor 410. The main memory 412 functions as the working memory for the main processor 410 and comprises a memory device or array of memory devices in which programs, instructions and data are stored. The main memory 412 may comprise any suitable type of memory such as dynamic random access memory (DRAM) or any of the various types of DRAM devices such as synchronous DRAM (SDRAM), extended data output DRAM (EDO-DRAM), or Rambus DRAM (RDRAM). The main memory 412 is an example of a non-transitory computer-readable medium storing programs and instructions, and other examples are disk drives and flash memory devices.

The illustrative computer system also comprises a second bridge 428 that bridges the primary expansion bus 426 to various secondary expansion buses, such as a low pin count (LPC) bus 430 and peripheral components interconnect (PCI) bus 432. Various other secondary expansion buses may be supported by the bridge device 428.

Firmware hub 436 couples to the bridge device 428 by way of the LPC bus 430. The firmware hub 436 comprises read-only memory (ROM) which contains software programs executable by the main processor 410. The software programs comprise programs executed during and just after power on self-test (POST) procedures as well as memory reference code. The POST procedures and memory reference code perform various functions within the computer system before control of the computer system is turned over to the operating system. The computer system further comprises a network interface card (NIC) 438 illustratively coupled to the PCI bus 432. The NIC 438 acts to couple the computer system to a communication network, such the Internet, or local- or wide-area networks.

Still referring to FIG. 4, the computer system may further comprise a super input/output (I/O) controller 440 coupled to the bridge 428 by way of the LPC bus 430. The Super I/O controller 440 controls many computer system functions, for example interfacing with various input and output devices such as a keyboard 442, a pointing device 444 (e.g., mouse), a pointing device in the form of a game controller 446, various serial ports, floppy drives and disk drives. The super I/O controller 440 is often referred to as "super" because of the many I/O functions it performs.

The computer system may further comprise a graphics processing unit (GPU) 450 coupled to the host bridge 414 by way of bus 452, such as a PCI Express (PCI-E) bus or Advanced Graphics Processing (AGP) bus. Other bus systems, including after-developed bus systems, may be equivalently used. Moreover, the graphics processing unit 450 may alternatively couple to the primary expansion bus 426, or one of the secondary expansion buses (e.g., PCI bus 432.) The graphics processing unit 450 couples to a display device 454 which may comprise any suitable electronic display device upon which any image or text can be plotted and/or displayed. The graphics processing unit 450 may comprise an onboard processor 456, as well as onboard memory 458. The processor 456 may thus perform graphics processing, as commanded by the main processor 410. Moreover, the memory 458 may be significant, on the order of several hundred megabytes or more. Thus, once commanded by the main processor 410, the graphics processing unit 450 may perform significant calculations regarding graphics to be displayed on the display device, and ultimately display such graphics, without further input or assistance of the main processor 410.

Figure 5:
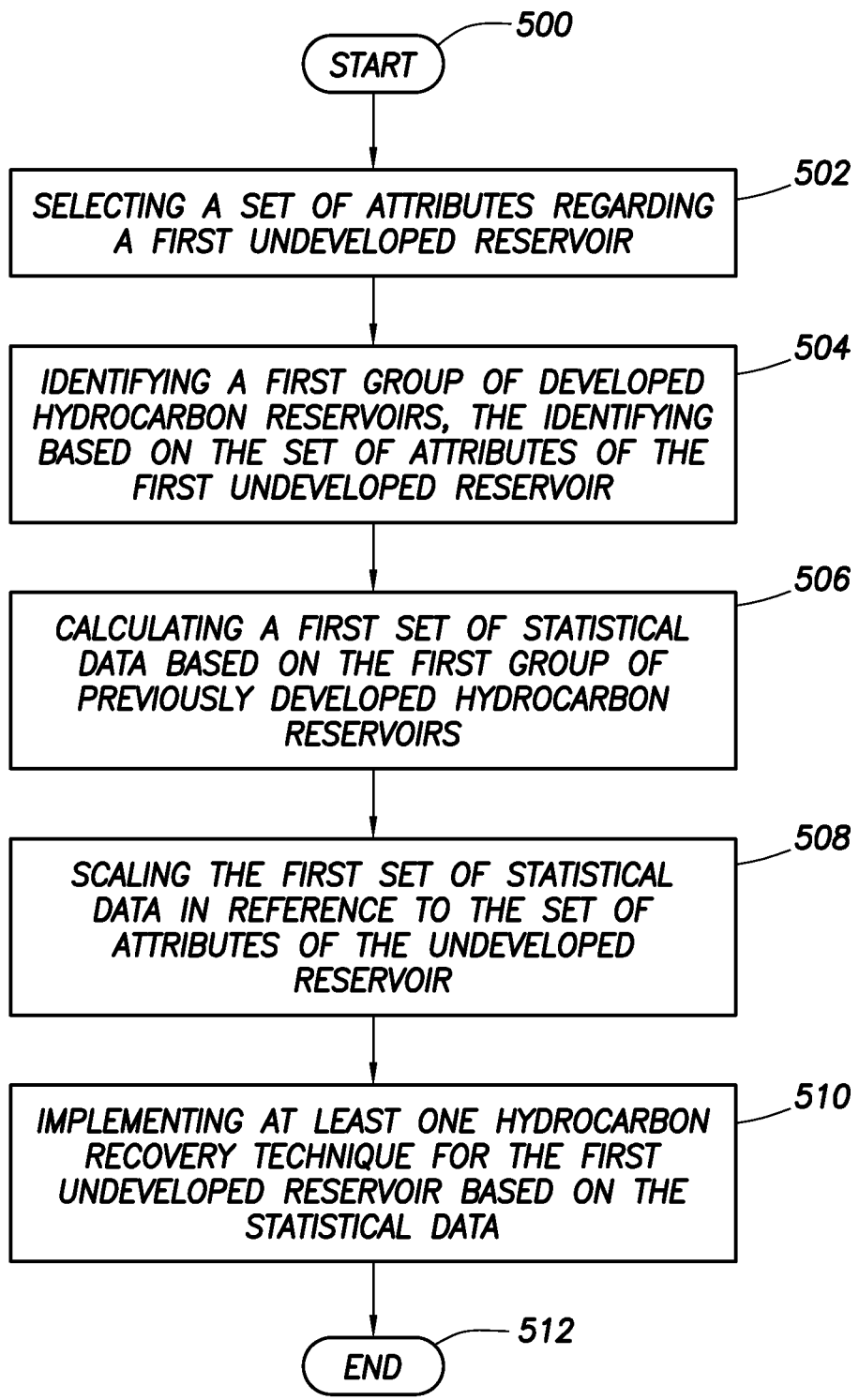
FIG. 5 shows an example method in accordance with at least some embodiments.

FIG. 5, which shows a method of developing a hydrocarbon recovery strategy, will now be discussed in more detail. The method starts (block 500) and moves to selecting a set of attributes regarding a first undeveloped hydrocarbon reservoir (block 502). Next, the method may comprise identifying a first group of developed hydrocarbon reservoirs, the identifying based on the set of attributes of the first undeveloped hydrocarbon reservoir (block 504). The method then moves to calculating a first set of statistical data based on the first group of previously developed hydrocarbon reservoirs (block 506). Thereafter, the method may comprise scaling the first set of statistical data in reference to the set of attributes of the undeveloped hydrocarbon reservoirs (block 508). The method then moves to implementing at least one hydrocarbon recovery technique in the first undeveloped hydrocarbon reservoir based on the statistical data (block 510). Thereafter, the method ends (block 512).

It is noted that while theoretically possible to perform some or all the calculations, simulations, and/or modeling by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of hydrocarbon recovery strategy development, this context shall not be read as a limitation as to the scope of one or more of the embodiments described. It is intended that the following claims be interpreted to embrace all such variations and modifications.

What is claimed is:

1. A computer-implemented method comprising:
selecting, by a computer system, a set of attributes for a first undeveloped hydrocarbon reservoir;
obtaining, from a database coupled to the computer system via a communication network, attribute data related to a plurality of developed hydrocarbon reservoirs;
identifying a first group of developed hydrocarbon reservoirs within the plurality of developed hydrocarbon reservoirs that have attributes matching the set of attributes selected for the first undeveloped hydrocarbon reservoir, based on a comparison between the set of attributes of the first undeveloped hydrocarbon reservoir and the attribute data obtained for the plurality of developed hydrocarbon reservoirs, the identifying by the computer system;
calculating a first set of statistical data based on the identified first group of developed hydrocarbon reservoirs, the calculating by the computer system;
scaling the first set of statistical data in reference to the set of attributes of the first undeveloped hydrocarbon reservoir to create a second set of statistical data, the scaling by the computer system; and
implementing at least one hydrocarbon recovery strategy for the first undeveloped hydrocarbon reservoir based on the second set of statistical data.

2. The method of claim 1 wherein identifying the first group of developed hydrocarbon reservoirs further comprises performing a nearest-neighbor mathematical analysis.

3. The method of claim 2 wherein the nearest-neighbor mathematical analysis is based on at least one from the group consisting of: hydrocarbon type as between the first undeveloped hydrocarbon reservoir and each member of the first group of developed hydrocarbon reservoirs; formation type as between the first undeveloped hydrocarbon reservoir and each member of the first group of developed hydrocarbon reservoirs; and recovery technique as between an expected recovery technique for the first undeveloped hydrocarbon reservoir and utilized recovery type for each member of the first group of developed hydrocarbon reservoirs.

4. The method of claim 1 wherein scaling further comprises adjusting the first set of statistical data to account for differences in a value indicative of initial hydrocarbon reserve quantity as between the first undeveloped reservoir and a value indicative of initial hydrocarbon reserve quantity of the first group of developed hydrocarbon reservoirs.

5. The method of claim 1 further comprising:
calculating a third set of statistical data regarding the first undeveloped hydrocarbon reservoir after the first undeveloped hydrocarbon reservoir has undergone at least partial development; and then
calculating a value indicative of performance of the undeveloped hydrocarbon reservoir based on the second set of statistical data and the third set of statistical data.

6. The method of claim 1 wherein selecting the set of attributes further comprises selecting at least one from the group consisting of: rock type; recovery method; burial depth; burial temperature; location; initial hydrocarbon volume; secondary recovery technique; porosity of the formation; permeability of the formation; and surface accessibility.

7. The method of claim 1 wherein calculating the first set of statistical data further comprises calculating at least one selected from the group comprising: average hydrocarbon production; maximum hydrocarbon production; minimum hydrocarbon production; hydrocarbon production rate; secondary recovery fluid production rate; oil production rate; gas production rate; cumulative oil recovery; average hydrocarbon recovery cost; and hydrocarbon recovery cost.

8. A computer system comprising:
a processor;
a display device coupled to the processor; and
a memory coupled to the processor, the memory storing a program that, when executed by the processor, causes the processor to:
obtain, from a database via a communication network, attribute data related to a plurality of developed hydrocarbon reservoirs;
identify a first group of developed hydrocarbon reservoirs within the plurality of developed hydrocarbon reservoirs that have attributes matching the set of attributes selected for the first undeveloped hydrocarbon reservoir, based on a comparison between a set of attributes of a first undeveloped hydrocarbon reservoir and the attribute data obtained for the plurality of developed hydrocarbon reservoirs;
calculate a first set of statistical data based on the identified first group of previously developed hydrocarbon reservoirs;
scale the first set of statistical data in reference to the set of attributes of the undeveloped hydrocarbon reservoir to create a second set of statistical data;
determine at least one hydrocarbon recovery strategy for the first undeveloped hydrocarbon reservoir based on the second set of statistical data; and
display an indication of the hydrocarbon recovery strategy on the display device, wherein the hydrocarbon recovery strategy is implemented for the first undeveloped hydrocarbon reservoir in accordance with the displayed indication.

9. The system of claim 8 wherein when the processor identifies the first group of developed hydrocarbon reservoirs, the program further causes the processor to perform a nearest-neighbor mathematical analysis.

10. The system of claim 9 wherein when the processor performs the nearest-neighbor mathematical analysis, the program causes the processor to perform the nearest-neighbor mathematical analysis based on at least one from the group consisting of: hydrocarbon type as between the first undeveloped hydrocarbon reservoir and each member of the first group of developed hydrocarbon reservoirs; formation type as between the first undeveloped hydrocarbon reservoir and each member of the first group of developed hydrocarbon reservoirs; and recovery technique as between an expected recovery type for the first undeveloped hydrocarbon reservoir and utilized recovery type for each member of the first group of developed hydrocarbon reservoirs.

11. The system of claim 8 wherein the program further causes the processor to:
calculate a third set of statistical data regarding the first undeveloped hydrocarbon reservoir after the first undeveloped hydrocarbon reservoir has undergone at least partial development; and then
calculate a value indicative of performance of the undeveloped hydrocarbon reservoir based on the second set of statistical data and the third set of statistical data.

12. The computer system of claim 8 wherein the program further causes the processor to perform at least one selected from the group consisting of: select a set of attributes regarding a first undeveloped hydrocarbon reservoir; and receive, by way of an interface device, a set of attributes regarding the first undeveloped hydrocarbon reservoir.

13. The system of claim 8 wherein when the program causes the processor to select the set of attributes being at least one from the group consisting of: rock type; recovery method; burial depth; burial temperature; location; initial hydrocarbon volume; secondary recovery technique; porosity of the formation; permeability of the formation; and surface accessibility.

14. The system of claim 8 wherein when the processor calculates the second set of statistical data, the program further causes the processor to calculate at least one from the group consisting of: average hydrocarbon production; maximum hydrocarbon production; minimum hydrocarbon production; hydrocarbon production rate; secondary recovery fluid production rate; oil production rate; gas production rate; cumulative oil recovery; average hydrocarbon recovery cost; maximum hydrocarbon recovery cost; minimum hydrocarbon recovery cost.

15. A non-transitory computer-readable medium storing instructions that, when executed by a processor, causes the processor to:
    select a set of attributes regarding a first undeveloped hydrocarbon reservoir;
    obtain, from a database via a communication network, attribute data related to a plurality of developed hydrocarbon reservoirs;
    identify a first group of developed hydrocarbon reservoirs within the plurality of developed hydrocarbon reservoirs that have attributes matching the set of attributes selected for the first undeveloped hydrocarbon reservoir, based on a comparison between the set of attributes of the first undeveloped hydrocarbon reservoir and the attribute data obtained for the plurality of developed hydrocarbon reservoirs;
    calculate a first set of statistical data based on the identified first group of previously developed hydrocarbon reservoirs, the calculating by the computer system;
    scale the first set of statistical data in reference to the set of attributes of the undeveloped hydrocarbon reservoir to create a second set of statistical data;
    determine at least one hydrocarbon recovery strategy for the first undeveloped hydrocarbon reservoir based on the second set of statistical data; and
    display an indication of the hydrocarbon recovery strategy on a display device coupled to the processor, wherein the hydrocarbon recovery strategy is implemented for the first undeveloped hydrocarbon reservoir in accordance with the displayed indication.

16. The non-transitory computer-readable medium of claim 15 wherein when the processor identifies the first group of developed hydrocarbon reservoirs, the program further causes the processor to perform a nearest-neighbor mathematical analysis.

17. The non-transitory computer-readable medium of claim 16 wherein when the processor performs the nearest-neighbor mathematical analysis, the program causes the processor to perform based on at least one from the group consisting of: hydrocarbon type as between the first undeveloped hydrocarbon reservoir and each member of the first group of developed hydrocarbon reservoirs; formation type as between the first undeveloped hydrocarbon reservoir and each member of the first group of developed hydrocarbon reservoirs; and recovery technique as between an expected recovery type for the first undeveloped hydrocarbon reservoir and utilized recovery type for each member of the first group of developed hydrocarbon reservoirs.

18. The non-transitory computer-readable medium of claim 15 wherein the program further causes the processor to:
    calculate a third set of statistical data regarding the first undeveloped hydrocarbon reservoir after the first undeveloped hydrocarbon reservoir has undergone at least partial development; and then
    analyze the third set of statistical data in light of the second set of statistical data in order to evaluate the hydrocarbon recovery strategy implemented.

19. The non-transitory computer-readable medium of claim 15 wherein when the processor selects the set of attributes, the program further causes the processor to select at least one from the group consisting of: rock type; recovery method; burial depth; burial temperature; location; initial hydrocarbon volume; secondary recovery technique; porosity of the formation; permeability of the formation; surface accessibility.

20. The non-transitory computer-readable medium of claim 15 calculates the second set of statistical data, the program further causes the processor to calculate at least one from the group consisting of: average hydrocarbon production; maximum hydrocarbon production; minimum hydrocarbon production; hydrocarbon production rate; secondary recovery fluid production rate; oil production rate; gas production rate; cumulative oil recovery; average hydrocarbon recovery cost; maximum hydrocarbon recovery cost; minimum hydrocarbon recovery cost.

* * * * *